E. FEUILLETTE.
TRACTOR WHEEL.
APPLICATION FILED MAY 26, 1920.

1,422,952.

Patented July 18, 1922.
4 SHEETS—SHEET 2.

Inventor:
Emile Feuillette
By Wm E. Boulter,
attorney

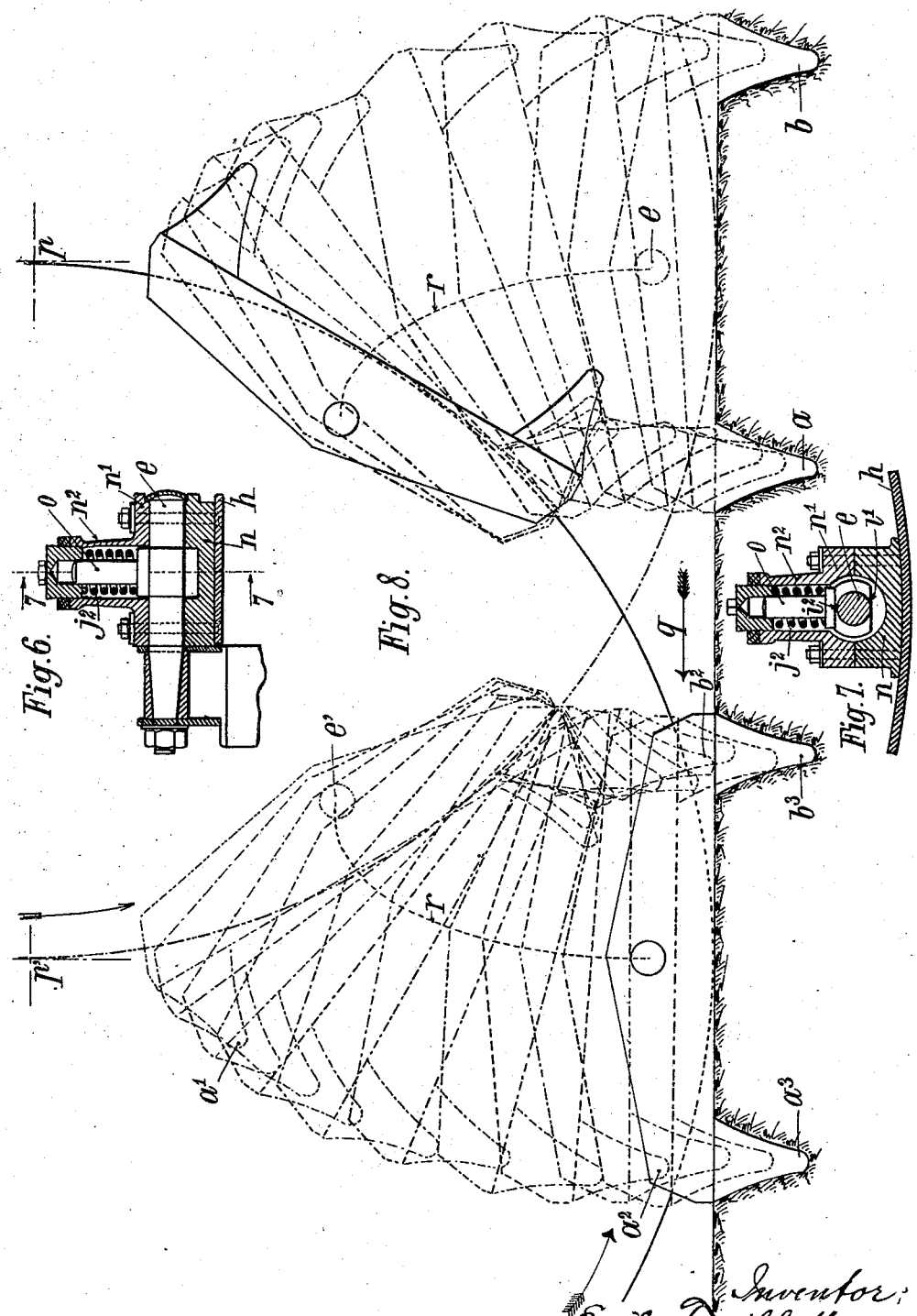

E. FEUILLETTE.
TRACTOR WHEEL.
APPLICATION FILED MAY 26, 1920.

1,422,952.

Patented July 18, 1922.
4 SHEETS—SHEET 4.

Inventor,
Emile Feuillette
By Geo. E. Boulter
Attorney

UNITED STATES PATENT OFFICE.

EMILE FEUILLETTE, OF BOULOGNE-SUR-SEINE, FRANCE, ASSIGNOR TO LA SOCIETE DES ETABLISSEMENTS E. FEUILLETTE, OF BOULOGNE-SUR-SEINE, FRANCE.

TRACTOR WHEEL.

1,422,952.  Specification of Letters Patent.  Patented July 18, 1922.

Application filed May 26, 1920. Serial No. 384,280.

*To all whom it may concern:*

Be it known that I, EMILE FEUILLETTE, a citizen of the French Republic, residing at Boulogne-sur-Seine, France, have invented certain new and useful Improvements in Tractor Wheels, of which the following is a specification.

The efficiency of agricultural tractors is greatly improved if their wheels have a good grip on the soil. Hitherto the wheels have been provided with grips secured to the tire of the driving wheels. These grips are of various forms, sometimes that of spikes surrounding the tire, sometimes that of angle irons projecting at the side of the wheel. All the systems used give more or less satisfactory results provided that the earth is hard, but if the earth is loose or damp, it sticks to the wheels, fills up the intervals between the grips, whatever be their shape, and thus forms a smooth wheel of an increased diameter, resulting in a sliding of the tractor on the ground. The efficiency of the tractor decreases, and the consumption of power increases in such a useless manner as to render the use of the tractor impracticable.

In agriculture, the soil and the nature of the ground are not only varied, but the humidity itself also varies, and thus the use of existing tractors is practically very limited, when employed in direct traction. Moreover, their systems of grips render impracticable (without risk of deterioration) their driving on roads and hard ground, and destroys in a short time some parts of the tractor. In practice, for a long drive on a road, the grips are dismantled, which involves a considerable amount of work, as the bolts are generally rusty and worn and frequently useless after a single removal.

These drawbacks having been stated, it appears that the best traction system is that by cable in which a winch is operated at each end of the field, as is done in the old "Fowler" system. But this system requires a plant which is so costly that it cannot be used on small and medium sized farms. Moreover, this system is practically limited to deep cultivation and cannot be used in practice for operating other apparatus for tilling, such as light ploughs, extirpators, harrows, sowing devices, harvesting apparatus, etc.

In addition to the systems employing a winch, the following are used at present in agriculture:

1. The heavy type of 5-8 tons, having driving wheels provided with grips, drawing ploughs with 3-6 shares. It has the serious drawback of compressing the earth, more particularly if the latter be loose or damp, and of rendering it sterile. It cannot be applied to the use of any cultivating apparatus except large ploughs. It is moreover of medium efficiency as it has an excessive dead weight.

2. The endless track type of various weights, drawing ploughs of various models. It does not seem to be at all applicable to intermediate cultivation, harrowing, rolling, etc., for, in turning, its endless tracks tear out the plants and deform the ground. This type is, on the other hand, heavy and costly, and wears out comparatively quickly, more particularly if it works on a road or on dry or sandy grounds.

3. The light type of 1000 to 2500 kilograms, having driving wheels provided with grips, drawing ploughs with 1-3 shares and other cultivating apparatus, and intended in a way to replace the farm horses. Its efficiency must be good as it has only a comparatively small dead weight, having regard to the great power of the motor that can be mounted on it. But unfortunately, its adhesion being weak on account of its lightness, its great power cannot be utilized which results in a bad efficiency. In practice, it is this light type which is called upon to render the greatest services to cultivation because it is comparatively cheap, and its price is within reach of all agricultural workings, and because, owing to its lightness, it can draw any known type of plough already used, harrows, sowing devices, harvesters, transport carts, etc. In short, it becomes the general farm tractor, provided however that its driving wheels find sufficient adhesion, in spite of its lightness, in all the grounds, and that their grips can be easily removed from them for driving on roads and on hard ground.

The present invention relates to a system of twin grips with swinging motion, and the object is—

(1) To obtain the greatest possible adhesion to the ground by hooking, and not on the surface, (2) To drive the grips into the ground and to withdraw them by a vertical movement, without tearing out of any earth, which results in a complete utilization of the driving action for the traction.

(3) To enable the tire of the wheel to retain a perfectly smooth surface which can be protected from adhesion of the earth by means of a scraper, (4) To avoid any earth sticking to the grips, and consequently to preserve their useful form and their full action, (5) To enable the grips to disappear instantaneously without dismantling, by turning them into the interior of the wheel, and to enable the smooth tire to travel on the road and on hard ground.

This invention also comprises a detachable stop adapted to limit the oscillation of the grips during their penetration into the earth, so that the said penetration is automatically progressive in accordance with the resistance of the earth and the traction effort required.

A construction according to this invention is illustrated in the accompanying drawing, in which—

Figure 3 is a view similar to Figure 1, with grips arranged at both sides of the wheel;

Figure 6 is a modified construction of Figure 4, with a spring enclosed in a tight casing;

Figure 7 is a section on line 7—7 of Figure 6, and

Figure 8 is a diagram showing the working of the grips.

Figure 1:
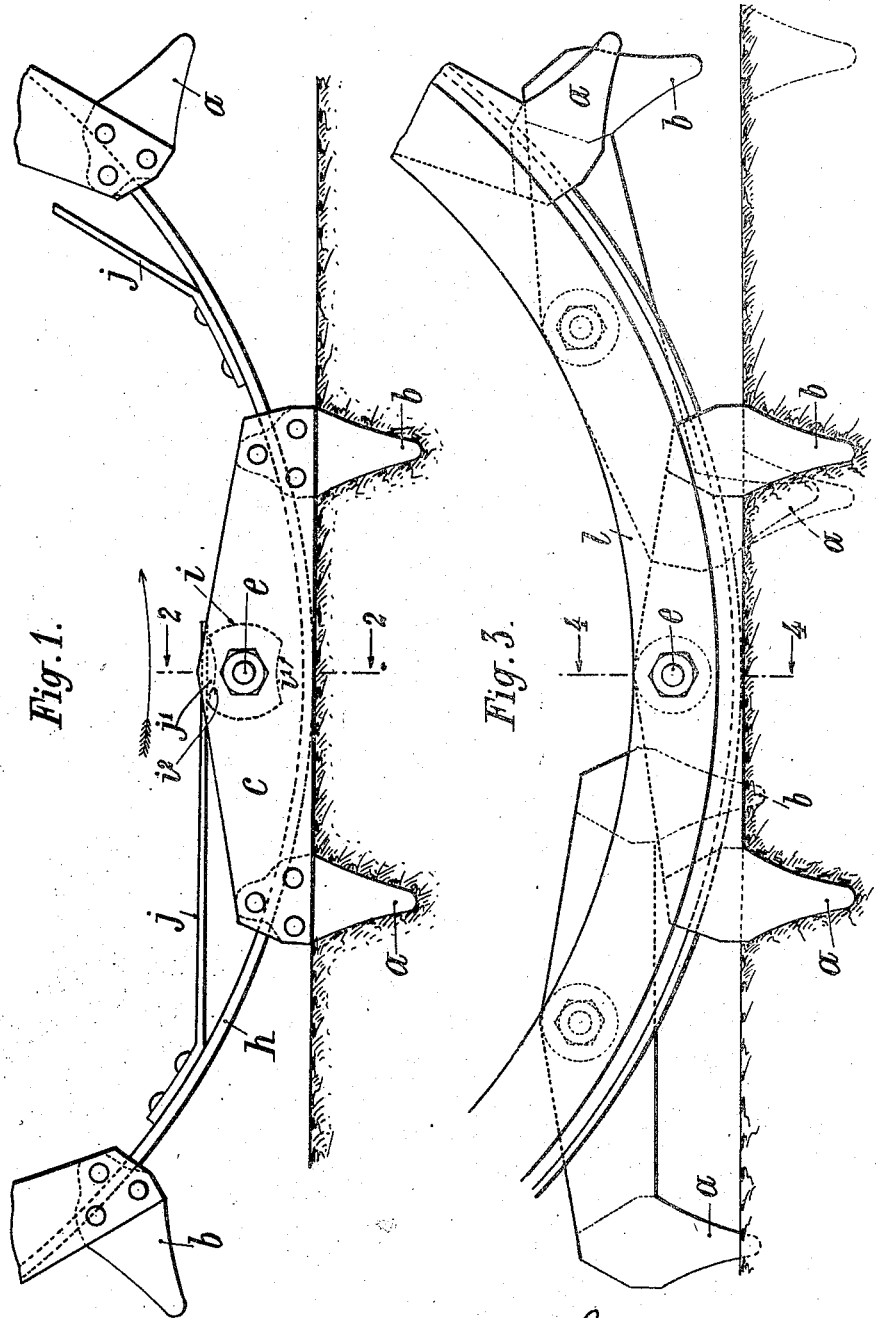
Figure 1 is a side elevation of part of a wheel of the tractor, provided with grips.
Figure 2:
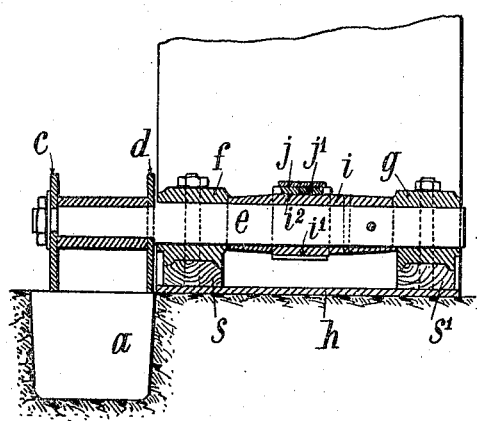
Figure 2 is a section on line 2—2 of Figure 1.
Figure 4:
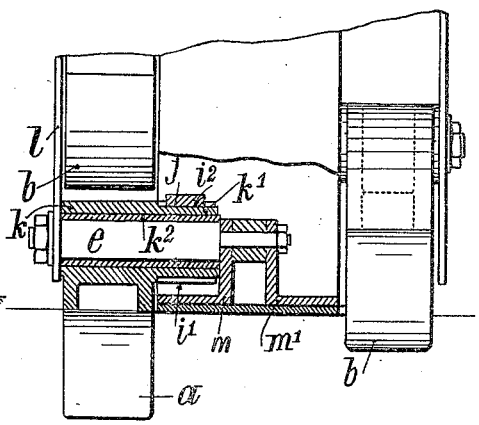
Figure 4 is a section on line 4—4 of Figure 3.

The device comprises substantially two grips $a$ and $b$ (Figure 1) of cast steel, held between two metal plates $c$ and $d$, the whole being mounted on a pin $e$ which rotates in two bearings $f$ and $g$ mounted in the interior of the rim $h$ of the tractor wheel. On the pin $e$ a cam $i$ is mounted having two flattened parts or depressions $i^1$ and $i^2$ which may be slightly concave. A spring blade $j$ is secured to the interior of the rim $h$ and presses against the flat part $i^2$ of the cam $i$ and keeps the whole device perpendicular to a radius which passes through its axis. The rim $h$ of the wheel is thus provided with several pairs of twin grips, at one side of the wheel as shown in Figures 1 and 2, or on each side of the wheel, as shown in Figures 3 and 4.

The construction of the grips can be modified at will, for instance the plates $c$ and $d$ which connect them together, can be done away with, and they can be cast in a single piece (Figures 3 and 4) with a hub $k$, the end $k^1$ of which is shaped as the cam $i$. In this case, the pin $e$ is fixed, and the grips $a$ and $b$ rotate thereon. The bearings of the pin $e$ of the twin grips $a$ and $b$ are constituted by an outer ring $l$ connecting together all the pins $e$, and by two angle irons $m$ and $m^1$ secured to the inside of the rim $h$. The hub $k$ of each pair of grips is provided with a sleeve or bush $k^2$ of brass or other metal which when worn out can be quickly replaced, without changing the grips. This cast part is perforated, as in the case of grips mounted on plates, and will provide in one or in the other case sufficient taper for facilitating the escape of the soil without compression. They thus retain their shape and their complete action. The cross-section of the grips $a$ and $b$ is such that in their removal from the earth, the latter is not lifted. In order to protect the pin $e$ of the grips and the spring $j$ (Figures 6 and 7) from the action of the earth, and to replace the spring blade by a helical spring $j^2$ which can work under better conditions than a spring blade, the pin $e$ is set in a bearing $n$ which forms a casing having a cap or cover $n^1$ surmounted by a cylinder $n^2$. In the interior of the cylinder $n^2$ is a piston which is constantly forced against a flattened part $i^2$ of the pin $e$ which also has a flattened part $i^1$.

The working of the apparatus is shown in Figure 8 which illustrates a centre wheel $p$ provided with two pairs of twin grips $a$, $b$, and $a^1$, $b^1$, the pins of which are $e$ and $e^1$. In such a construction the wheel $p$ will roll on the ground in the direction of the arrow $q$. The twin grips $a$ and $b$ are shown about to come out of the ground. The curve $r$ is the line of travel of the centre of the pin $e$ when the wheel occupies all the positions intermediate between $p$ and $p^1$; and this centre always remains on the same radius of the wheel, so that the system of grips remains perpendicular to the said radius. It will be seen that when coming out of the hole which it had made in the ground, the grip $a$ will be at a tangent to the wall of the hole, and will not tend to tear out the earth. As regards the grip $b$, it will come out of its hole without even touching the sides. During the operation, the pair of grips $a^1$, $b^1$ will be lowered towards the ground. The pin $e$ will follow the curve $r^1$. The grip $b^1$ will arrive at $b^2$, that is to say, it will meet the ground whilst the grip $a^1$ which has arrived at $a^2$, is still in the air. The grip $b^2$ therefore meets a resistance which causes the whole system to swing about its axis, until the grip $a^2$ strikes the ground. The effort of the wheel then acting in the centre of the system of grips on the pin $e^1$, the two grips $a^2$ and $b^2$ will be driven in together, until they are at the bottom of the holes at $a^3$ and $b^3$.

Therefore it will be seen that the driving of the grips into the soil and their withdrawal are obtained by a movement perpendicular to the ground, without tearing out the earth, which results in a complete use of the driving action for traction.

Figure 5:
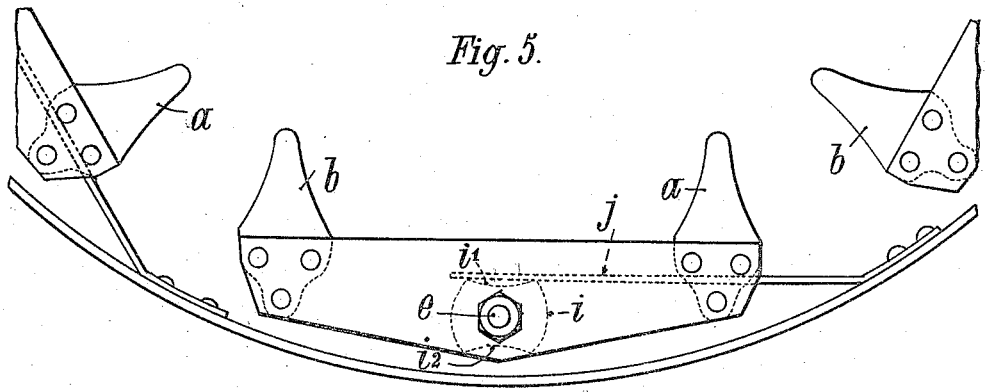
Figure 5 is a view similar to Figure 1 showing the grips raised to the position for driving on a road and on hard ground.

When it is desired to drive on a road or on hard ground, it is sufficient to swing by hand each pair of grips $a$ $b$. The cam $i$ turns with them, and the spring presses on the flat part $i^1$ and thus keeps the system in its new position, (Figure 5).

In the case where it is necessary to vary the grip of the same tractor, it is sufficient to vary the thickness of the wedges of wood or other material inserted between the bearings $f$ and $g$ and the rim $h$.

Figure 9:
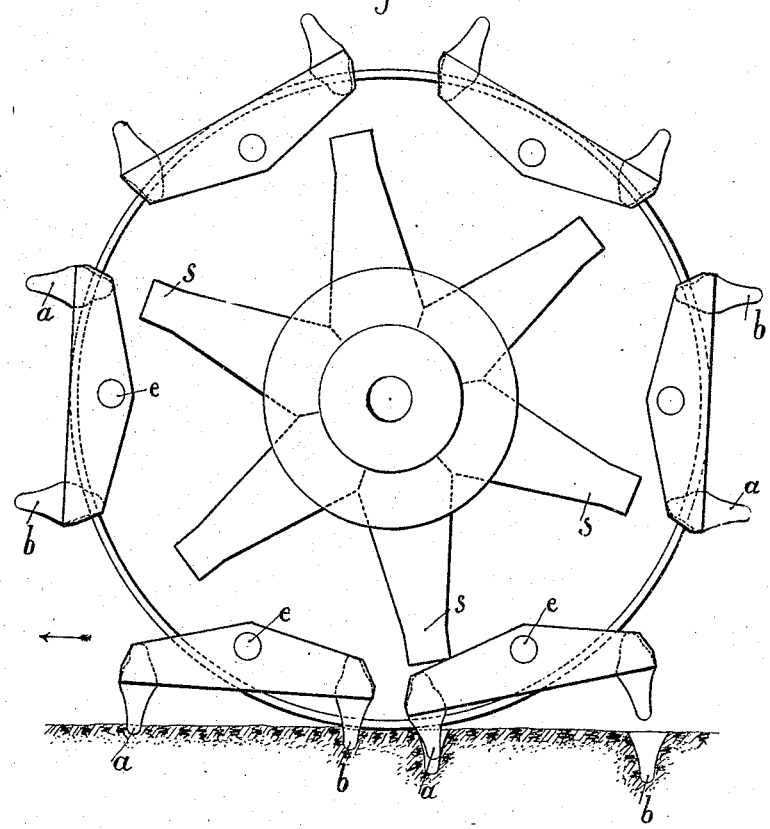
Figure 9 shows in elevation a wheel provided with a detachable stop.

When it is desired to limit driving the grips into the soil, it is possible to use, as has been indicated, a detachable stop which limits the oscillation of the grips. The said detachable grip, represented in Figure 9 of the drawing, is constituted by a spider comprising as many branches $s$ as the wheel comprises pairs of grips $a$ $b$, and arranged laterally of the wheel, to the hub of which it is secured by any suitable means.

The end of each of the said branches $s$ terminates a little above the rear end of each double grip in the mean position of rest, so that the amplitude of the movement of oscillation of the double grips is limited by each of them striking the corresponding branch of the spider $s$. In these conditions, when during the rotation of the wheel, the grip engages with the ground and becomes disengaged therefrom, it may experience (owing to the resistance which it meets during its disengagement) an impulse which tends to cause it to turn about the pin $e$, but the said rotation movement is at once limited by the branch $s$ of the spider, against which the moved double grip strikes.

When it is desired to turn over the grips in order to cause them to disappear into the interior of the wheel, as previously set forth, it is sufficient to loosen the nut which locks the spider $s$ against the hub of the wheel, then to disengage it laterally to the desired extent so as to enable the grips to turn. The spider is then locked again in its normal position on the wheel.

This construction of detachable stop makes it possible moreover to obtain a gradual penetration of the grips owing to the fact that, during the rotation of the wheel, the rear grip which first comes in contact with the ground, swings the whole of the double grip until it strikes the corresponding branch $s$ of the spider. From that moment, the rear grip is driven into the ground by the weight of the vehicle and then forms a point of support enabling the whole of the double grip to swing, and the front grip to penetrate progressively into the ground until the moment when the pivot pin of the said double grip assumes a position normal to the ground.

If at the moment when the double grip is being pulled out of the ground, its front grip, finding a certain difficulty in disengaging, tends to swing the double grip, this movement is prevented by the said double grip striking against the corresponding branch $s$ which then intervenes in order to assist progressively in the disengagement.

Figure 10:
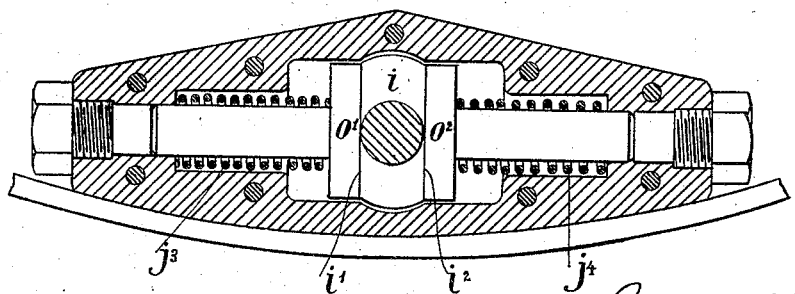
Figure 10 is a longitudinal section of the casing containing the return springs for the pivot pin of a pair of grips.

Figure 10 illustrates a modified construction of the resilient device previously described and is adapted automatically to return each double grip to its initial mean position of rest. In the said modified construction, the cam $i$ provided on the pin $e$ of each double grip, is keyed in such a manner relatively to the normal plane of the grips when resting on the ground that the two flattened parts $i^1$ and $i^2$ of the said cam are in a vertical position and held between the flat shoulders of two plungers $o^1$, $o^2$ controlled by the action of two springs $j^3$, $j^4$. In this construction, the opposed efforts of the two springs are balanced on the same pin, so that the bearings of the said pin are not exposed to strains from the springs, which results in a reduced wear.

The constructions hereinbefore described are given merely by way of example, and the shapes, dimensions, details of construction and application can vary without departing from this invention.

What I claim as my invention and desire to secure by Letters Patent is:—

1. A tractor wheel comprising in combination, spikes connected in pairs by means of cross bars, said spikes being mounted at the mid point of said cross bars on members whose axes are parallel to the axis of the wheel and rotates in bearings fixed on the rim of the wheel, said members having diametrically opposed flat portions which engage a resilient device to hold the pairs of spikes tangential to the rim, either in the projected or retracted position, and means to limit the oscillation of the pairs of spikes and facilitate their penetration into the ground.

2. A tractor wheel comprising in combination spikes connected in pairs by means of cross bars, said spikes being mounted at the mid point of said cross bars on members whose axes are parallel to the axis of the wheel and rotate in bearings fixed on the rim of the wheel; said members having two diametrally opposed flat portions which engage to hold the pairs of spikes tangential to the rim either in projected or retracted position, pistons perpendicular to the axis of the said members which force by means of a spring placed in a cylindrical casing enclosing the said bearing; and means to limit the oscillations of the pairs of spurs and facilitate their penetration into the earth.

3. A tractor wheel comprising in combination spikes connected in pairs by cross bars, said spikes being mounted at the mid point of said cross bar on members whose axes are parallel to the axis of the wheel and rotate in bearings fixed on the rim; said members having two diametrally opposed flat portions which engage two opposed pistons forced by two springs seated in a casing fixed inside the rim; a second cross bar having a number or arms equal to the number of pairs of spikes mounted on the hub the arms of which serve as stop members for the spikes.

In testimony whereof I have signed my name to this specification in the presence of a subscribing witness.

EMILE FEUILLETTE.

Witness:
   CHAS P. PRESSLY.